(12) United States Patent
Dreps et al.

(10) Patent No.: US 6,571,346 B1
(45) Date of Patent: *May 27, 2003

(54) ELASTIC INTERFACE FOR MASTER-SLAVE COMMUNICATION

(75) Inventors: Daniel Mark Dreps, Georgetown, TX (US); Frank David Ferraiolo, Essex, VT (US); Kevin Charles Gower, LaGrangeville, NY (US); Bradley McCredie, Austin, TX (US); Paul Coteus, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/434,800

(22) Filed: Nov. 5, 1999

(51) Int. Cl.$^7$ ................................................ G06F 1/04
(52) U.S. Cl. ...................................... 713/600; 713/500
(58) Field of Search ............................... 713/400, 401, 713/500, 501, 503, 600

(56) References Cited

U.S. PATENT DOCUMENTS 5,838,936 A  * 11/1998  Chau et al. ................... 713/600
5,968,180 A  * 10/1999  Baco ............................ 713/400
6,279,073 B1 *  8/2001  McCracken et al. ......... 711/105
6,334,163 B1 * 12/2001  Dreps et al. ................. 710/129

* cited by examiner

*Primary Examiner*—Dennis M. Butler
(74) *Attorney, Agent, or Firm*—Anthony V. S. England; Mark E. McBurney

(57) ABSTRACT

A method and apparatus are disclosed for communicating between a master and slave device. A sequence of data sets and a clock signal ("Bus clock") are sent from the master to the slave, wherein the successive sets are asserted by the master at a certain frequency, each set being asserted for a certain time interval. The data and Bus clock are received by the slave, including capturing the data by the slave, responsive to the received Bus clock. The slave generates, from the received Bus clock, a clock ("Local clock") for clocking operations on the slave. The sequence of the received data sets is held in a sequence of latches in the slave, each set being held for a time interval that is longer than the certain time interval for which the set was asserted by the master. The data sets are read in their respective sequence from the latches, responsive to the Local clock, so that the holding of respective data sets for the relatively longer time intervals in multiple latches and the reading of the data in sequence increases allowable skew of the Local clock relative to the received Bus clock.

18 Claims, 10 Drawing Sheets

ELASTIC INTERFACE FOR MASTER-SLAVE COMMUNICATION

CROSS REFERENCE TO RELATED APPLICATIONS

The present invention is related to the following U.S. Patent Applications, which are assigned to the same assignee, and are hereby incorporated herein by reference:

Ser. No. 09/263,671 entitled "Programmable Delay Element" now U.S. Pat. No. 6,421,784;

Ser. No. 09/263,662 entitled "Dynamic Wave Pipelined Interface Apparatus and Method Therefor";

Ser. No. 09/263,661 entitled "An Elastic Interface Apparatus and Method Therefore" now U.S. Pat. No. 6,334,163;

Ser. No. 09/363,951 entitled "A Method and System for Data Processing System Self-Synchronization"; and Ser. No. 09/434,801 entitled "An Elastic Interface Apparatus and Method", filed on the same date as the present application.

TECHNICAL FIELD

The present invention relates in general to data processing systems, and in particular, to the interface between clocked integrated circuit chips in a data processing system.

BACKGROUND

Data processing systems conventionally include a number of integrated circuit chips. For example, each of the following system elements may be on separate chips: a processor, a memory cache, a memory controller and system memory. Communication paths among the chips may differ in electrical length from one another. Also, any one of the paths may vary somewhat from one manufactured instance to the next, such as due to variation within a manufacturing tolerance, or changes in manufacturing process from one instance to the next. These issues arise not only with respect to signal propagation latency for paths among the chips in the system, but also with respect to latency on the chips themselves.

Such differing latencies among and on chips in a system present problems in synchronizing communication among the chips. For sufficiently large and varying latencies, it is conventional to communicate among chips over a bus using a protocol that includes tagging requests and responses. However this may slow communication, and adds substantial complexity. Where latency is small enough and its variation is sufficiently constrained, it is desirable to synchronize communication among chips merely by reference to clock signals on or among the chips. That is, it is desirable to synchronize communication without resorting to bus protocols that may include tagging of transactions.

DRAWINGS

DETAILED DESCRIPTION

To clearly point out novel features of the present invention, the following discussion omits or only briefly describes conventional features of high speed clocks, clock distribution, and clocked communication which are apparent to those skilled in the art.

In one or more of the above cross referenced applications, the desired clock-based synchronizing of interchip communication has been disclosed for embodiments wherein communication is among "master" chips using an "elastic interface." According to this master-master communication, a reference clock is distributed to each master, and each master generates its own local clock from the reference clock. The reference clock is distributed in such a manner that the local clocks of each master are in synchronism with one another. This, of course, requires that great care is taken in routing the reference clock to each master, so that latency is the same from the reference clock source to each master. Also, for the disclosed master to master communication, variations in on-chip clock distribution among the masters are compensated for by a phase locked loop on each master, so that the local clock remains in phase with the local clock's source (i.e., the reference clock) despite variations in loading on the source.

According to the master-slave communication of the present embodiment, for a "slave" chip: i) the local clock of the chip is sourced from a clock signal sent to the slave by the slave's master, ii) the clock source signal is not constrained to have a precise latency from master to slave, and iii) the slave's local clock is generated in open-loop fashion from the slave's local clock source, i.e. the slave's local clock is not phase locked to its clock source. In other contexts the term "slave" may have additional or different limitations; however, in the context of the present invention, any one of the above three limitations alone may be sufficient to distinguish a device, chip, etc. as a slave.

MASTER-SLAVE INTERFACE BLOCK DIAGRAM

Figure 1:
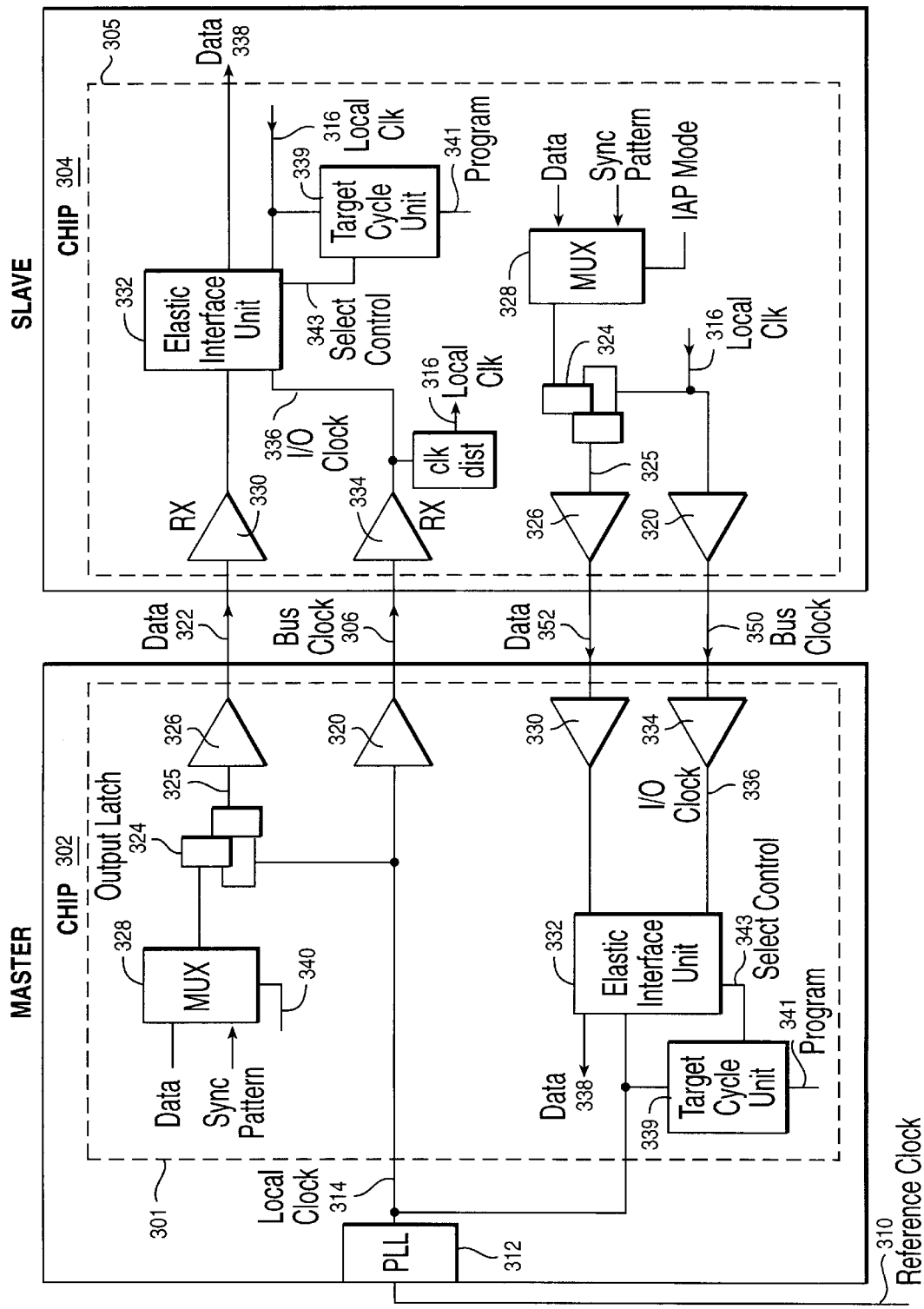
FIG. 1 illustrates, in block diagram form, an elastic interface for communication between master and slave chips in accordance with an embodiment of the present invention.

Refer now to FIG. 1, in which is illustrated an interface 300 in accordance with the present invention. Chip 302 is a master, having interface 301. Chip 304 is a slave, having interface 305. For example, chip 302 may be a processor and chip 304 may be a cache.

The master chip 302 has its own clock source 312, which the master uses for a local clock 314. Timing of a master's data processing and transmitting of data is referenced to the master's local clock. The master sends its local clock 314, buffered by driver 320 as a bus clock 306, to the slave chip 304. The master 302 launches data 322 to the slave chip 304 via multiplexer 328, latch 324 and driver 326. The communication paths from master to slave for data 322 from master to slave, and from master to slave for the bus clock 306 from master to slave, have substantially equal electrical lengths, and thus substantially equal latencies.

The slave chip 304 uses bus clock 306, received from the master, for its I/O clock 336 and local clock 316. Timing of the slave's data processing is responsive to the slave's local clock 316. Timing of the slave's receiving is referenced to the slave's I/O clock 336.

The slave 304 sends its local clock 316, buffered by the slave's driver 320 as a bus clock 350, to the master chip. The slave 304 launches data 352 to the master 302 via the slave's multiplexer 328, latch 324 and driver 326. The communication paths from slave to master for data 352 from slave to master, and from slave to master for the bus clock 350 from slave to master, have substantially equal electrical lengths, and thus substantially equal latencies.

The slave chip 304 is merely one instance of such a slave in the system. The system may include a number of slaves likewise configured. Thus the master 302 receives bus clocks from each one of the respective slaves having an interface with the master, i.e., an interface as shown in FIG. 1. The master uses the respective bus clock which the master receives from a slave for the master's I/O clock for data from that slave. Timing of a master's receiving data from a slave is referenced to the master's I/O clock for that slave.

Data 322 received by slave 304 from master 302 is buffered by the slave's receiver (RX) 330 and provided to the slave's elastic interface unit 332. Bus clock 306 sent by the master along with data 322 is buffered by RX 334, the output of which forms I/O clock 336, also provided to elastic interface 332. Data 352 from slave chip 304 being sent to master chip 302, along with bus clock 350, is similarly received by elastic interface 332 in master chip 302. However, slave data 338 is read out of elastic device 332 in slave 304 responsive to the slave local clock 316, which is derived from the master local clock 314. In contrast, master data 338 is read out of elastic device 332 in the master 302 responsive to the master local clock 314, which is an independent clock source, in the sense that it is not derived from some other local clock, such as the slave local clock 316. Likewise, target cycle unit 339 in slave 304 is responsive to slave local clock 316, which is derived from the master local clock 314; whereas target cycle unit 339 in master 302 is responsive to master local clock 314.

Target cycle unit 339 sets the target cycle on which data is latched by the local clock in the receiving chip. The target cycle is discussed more in detail later. For an interface having an elasticity, E, the target cycle unit may include a divide-by-E circuit. Additionally, target cycle unit 339 may include a programming register for holding the predetermined target cycle value, which may be loaded via target program 341. The target cycle programmed in target cycle unit 339 in chip 302 may be different than the target cycle programmed in target cycle unit 339 in chip 304. Target cycle unit 339 outputs select control 343, which may include a plurality of signals, depending on the embodiment of interface unit 332 and the corresponding elasticity, E.

Figure 2:
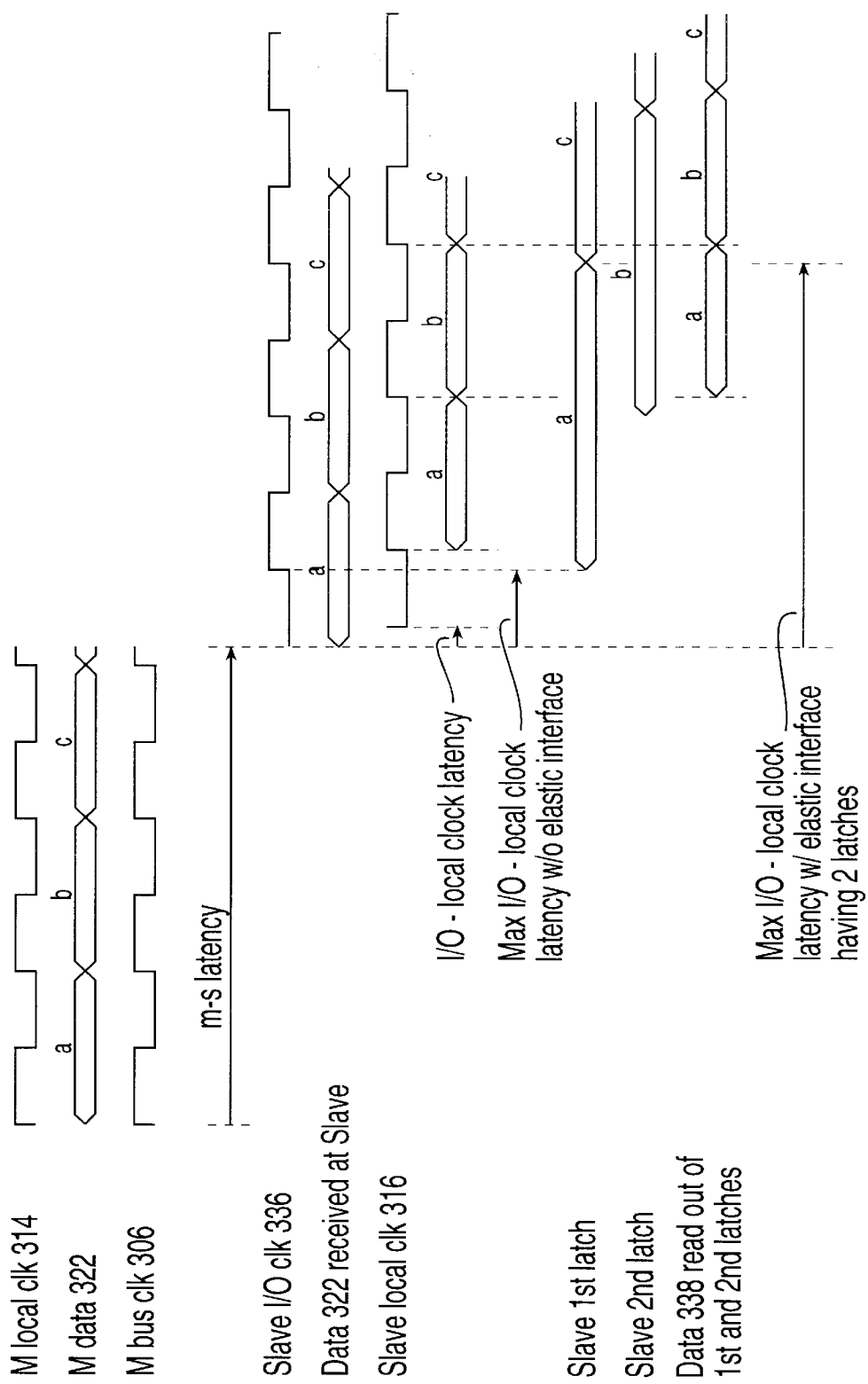
FIG. 2 is a timing diagram illustrating certain aspects of communication for the interface of FIG. 1.

Referring now to timing diagram, FIG. 2, certain aspects are illustrated of master-slave communication. Also, in FIG. 2 such communication is contrasted for instances with and without the elastic interface aspect of the present invention. Data 322 is launched along with bus clock 306 from the master 302 to slave 304. A "master to slave" latency of slightly more than three bus clock 306 cycles is shown from the time of sending of the bus clock 306 to that of generating I/O clock 336 therefrom at slave 304. The slave local clock 316 is also generated from the received bus clock 306. The local clock 316 has a large latency shown with respect to the I/O clock. This latency arises because the local clock distribution sources a much larger number of circuits than the I/O clock.

For a case without the elastic interface aspect of the present invention wherein the data 322 received at slave 304 is latched on a second rising edge of local clock 316, note that the maximum latency of the local clock 316 relative to I/O clock 336 is as shown. If the latency were greater, the second rising edge of local clock 316 would miss the period during which data A is asserted.

With the elastic interface aspect of the present invention, data A, C, etc. are latched in a first latch of the slave chip elastic interface 332 on a second rising edge of the I/O clock 336 and held for two cycles thereof. Likewise, data B, D, etc. are latched in a second latch of the slave chip elastic interface 332 on a second rising edge of the I/O clock 336. Then A is read out of the first latch, responsive to a certain edge as shown of the local clock 316, B is read out of the second latch, responsive to a subsequent certain edge as shown of the local clock 316, C is read out of the first latch, etc. By holding the data for multiple cycles in these latches and reading it back out from one latch and then the other, the maximum allowable latency of the local clock 316 relative to the I/O clock 336 has been extended to the limit as shown. It should be understood that the inventive method and apparatus are not limited to the particular number of cycles and latches shown in this illustrative embodiment. The data could be held for longer intervals and alternated among more than two latches, and therefor the limit to latency as shown may be extended further.

Additional details and implications of the above, and some variations thereof are described in the following.

TIMING AND CONTROL OF MASTER TO SLAVE COMMUNICATION

The following describes further details related to above, regarding structure and method for timing the latching of data in slave latches responsive to I/O clock, and reading out of the data responsive to the local clock.

Figure 4:
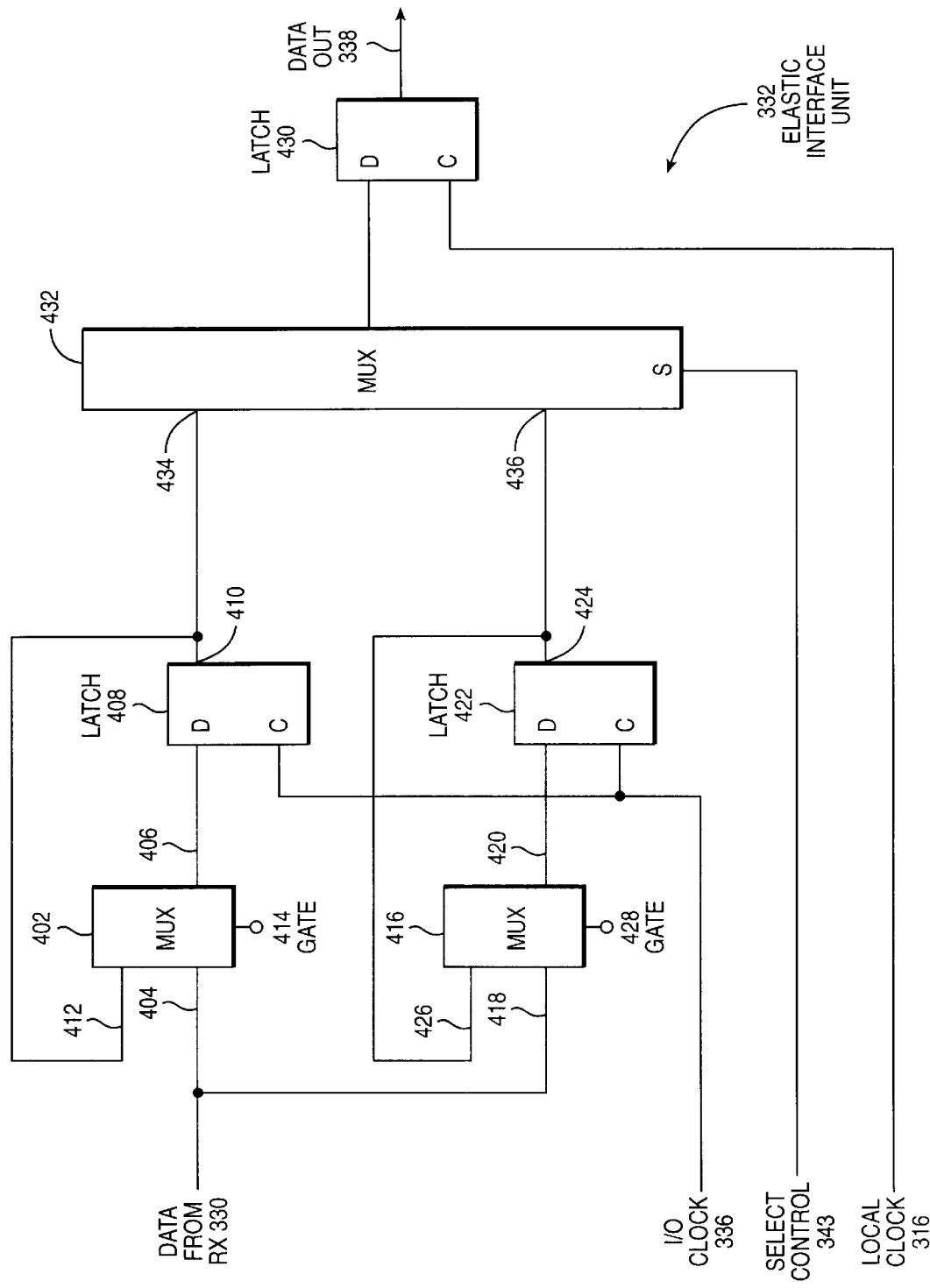
FIG. 4 illustrates, in block diagram form, an elastic interface unit in accordance with an embodiment of the present invention.

Refer now to FIG. 4, illustrating an embodiment of an elastic interface unit 332 in accordance with the present invention. Unit 332 includes MUX 402 having an input 404 which receives data from RX 330. Output 406 of MUX 402 is coupled to the data (D) input of latch 408. Latch 408 is clocked by I/O clock 336. Latch 408 latches data at the D input thereof on a rising edge of clock 336 and holds the data until a next rising edge of clock 336. Output 410 of latch 408 is coupled back to a second input, input 412 of MUX 402. MUX 402 selects between input 404 and input 412 for outputting on output 406 in response to gate 414.

Gate 414 is derived from bus clock 306 and has twice the period of bus clock 306(?). Gate 414 may be generated using a delay lock loop (DLL). An embodiment of a DLL which may be used in the present invention is disclosed in commonly owned, co-pending application entitled "Dynamic Wave Pipelined Interface Apparatus and Method Therefor," cross-referenced and incorporated hereinabove. The phase of gate 414 is set during the initialization alignment procedure discussed below, and the operation of gate 414 will be further described below.

The data from RX 330 is also fed in parallel to a second MUX, MUX 416, on input 418. Output 420 of MUX 416 is coupled to a D input of a second latch, latch 422, which is also clocked by I/O clock 336, and latches data on a rising edge of I/O clock 336 and holds the data until a subsequent rising edge of the clock. Output 424 of latch 422 is coupled to a second input, input 426 of MUX 416.

MUX 416 selects between input 418 and input 426 in response to the complement of gate 414, gate 428. Thus, when one of MUXs 402 and 416 is selecting for the data received from RX 330, the other is selecting for the data held in its corresponding latch, one of latches 408 and 422. In this way, a data bit previously stored in one of latches 408 and 422 is held for an additional cycle of I/O clock 336.

Hence, two data streams are created, each of which is valid for two periods of I/O clock 336. Because of the phase reversal between gate 414 and gate 428, the two data streams are offset from each other by a temporal width of one data value, that is, one cycle of I/O clock 336.

Figure 7:
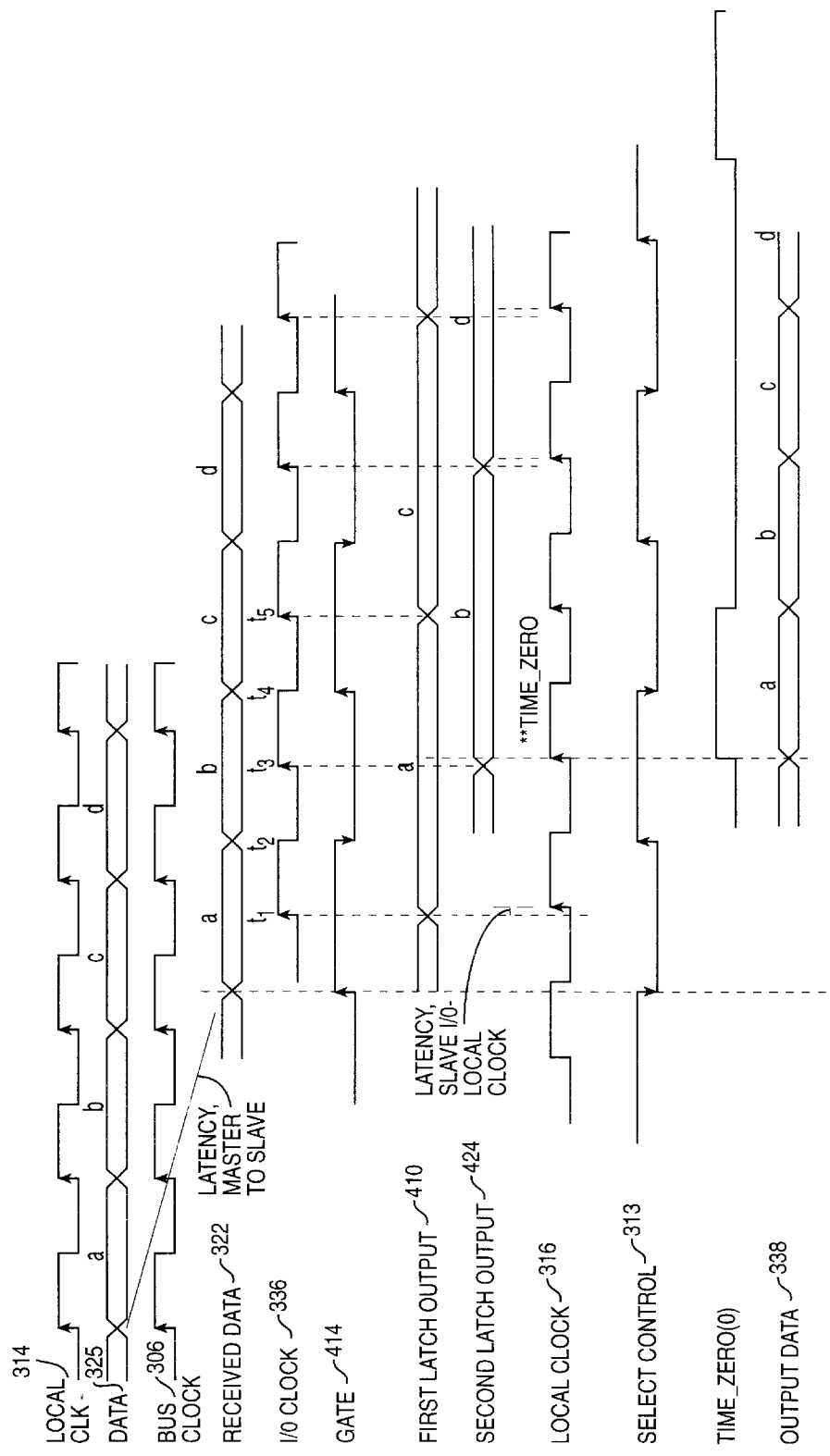
FIG. 7 is a timing diagram illustrating, in more detail than FIG. 2, certain aspects of communication for the interface of FIG. 1.

Referring now to FIG. 7, a timing diagram is shown for master to slave communication in accordance with the above. As previously described, data 325 held in output latch 324 of master chip 302 is launched in synchrony with local clock 314 from master chip 302. The data, upon receipt at RX 330 in chip 304, is delayed by the latency of the path between chips 302 and 304, as discussed hereinabove. The bus clock 306, upon receipt at Rx 334 at chip 304 is correspondingly delayed.

Slave 304 I/O clock 336 is obtained from bus clock 306, as shown in FIG. 1. It is assumed that, at launch, bus clock 306 is centered in a data valid window, as illustrated in FIG. 7. Bus clock centering is described in the commonly-owned, co-pending application entitled "Dynamic Wave-Pipelined Interface and Method Therefor," cross-referenced and incorporated hereinabove. As previously stated, bus clock 306 suffers a delay across the interface corresponding to the delay for the data 322. Since latency of bus clock 306 and data 322 from chip 302 to chip 304 is substantially comparable, since this is reflected in I/O clock 336, and since latency due to I/O clock distribution is relatively small, therefore I/O clock 336 substantially centered relative to data 322 at chip 304.

For this embodiment, where E=2, gate 414 has frequency 1/E, and is synchronized with the I/O clock such that the edges of gate 414 are phase coherent with the falling edges of I/O clock 336. Thus, on rising edge $t_1$ of I/O clock 336, gate 414 is asserted, or "open", and the data from RX 330 at input 404 of MUX 402 is thereby selected for outputting by MUX 402. (A gate will be termed open when the corresponding MUX selects for the input receiving the incoming data stream. Although this is associated with a "high" logic state in the embodiment, it would be understood that an alternative embodiment in which an open gate corresponded to a "low" logic level would be within the spirit and scope of the present invention.) With data 322 value "a" being output by MUX 402 at rising edge $t_1$ of I/O clock 336, and with latch 408 being clocked by I/O clock 336, data "a" is captured by latch 408 at $t_1$. Gate 428 is negated when gate 414 is asserted. Thus, at time $t_1$, in response to gate 428 being low, MUX 416 selects input 426, i.e., a previous data value being held in latch 422.

At edge $t_2$ of I/O clock 336, gate 414 falls. In response to gate 414 low, MUX 402 selects input 412, i.e., data "a", the output of latch 408. When gate 414 is negated, gate 428 is asserted. In response to gate 428 being high, MUX 416 selects input 418, i.e., data 330, as output 420. This output 420 is coupled to the D input of latch 422. However, at this time, the output of latch 422 is still held at its previous value, and latch 422 does not capture data "a" awaiting a new rising edge of the I/O clock 336 input to the latch 422.

At rising edge $t_3$ of I/O clock, the data received from RX 330 now corresponds to data value "b" of data 322, and this value is captured by latch 422 and is output at 424. Gate 414 is still low, so MUX 402 still selects input 412, i.e., data "a", the output 410 of latch 408, so that data "a" is captured by latch 408 for another cycle of I/O clock 336.

At edge $t_4$ of I/O clock 336, gate 414 rises. When gate 414 is high, gate 428 is low. In response to gate 428 being low, MUX 416 selects input 426, i.e., data "b" being held at the output 420 of latch 422. In response to gate 414 high, MUX 402 selects input 404, i.e., data "b", the data from RX 330. However, at this time, the output of latch 408 is still held at its previous value, and latch 408 does not latch data "b" awaiting a new rising edge of the I/O clock 336.

At rising edge $t_5$ of I/O clock 336, the data received from RX 330 now corresponds to data value "c" of data 322, and this value is captured by latch 408 and output at 410. Gate 428 is still low, so MUX 416 still selects input 426, i.e., data "b", the output 420 of latch 422, so that data "b" is captured by latch 422 for another cycle of I/O clock 336.

In subsequent cycles, as a stream of data continues to arrive on data 322, elastic device 332 continues, in this way, to generate two data streams at outputs 410 and 424 of latches 408 and 422, respectively. The two data streams contain alternating portions of the input data stream arriving on data 322 which are valid for two periods of I/O clock 336.

The structure of the input data stream is restored by alternately selecting values from one of the two data streams under control of the following signals: local clock 316, select control 343 and time zero 344. As previously stated, local clock 316 is generated from bus clock 306 sent by master 304. (Local clock 316 is shown having a 180 degrees phase shift with respect to I/O clock 336. This is arbitrary and a design choice which depends on the local clock latency.) Additionally, as may be seen with reference to FIG. 2, the local clock may have skew, with respect to I/O clock 336, of up to 2 cycles of the I/O clock.

In FIG. 4, note that two latches, 408 and 422 are shown in the elastic unit 332, but up to four latches are contemplated. The number of latches depends on how much latency there is for which there must be compensation. As described in one or more of the above cross-referenced applications, during an initialization and alignment procedure a data sequence of "10001000 . . . " is sent from the master to the slave and back from the slave to the master. Responsive to the data, the phase of gate 414 is adjusted so that the 1 in this sequence is captured in the first latch, latch 408, of the set of two, three or possibly four latches in the elastic unit 332.

Figure 5:
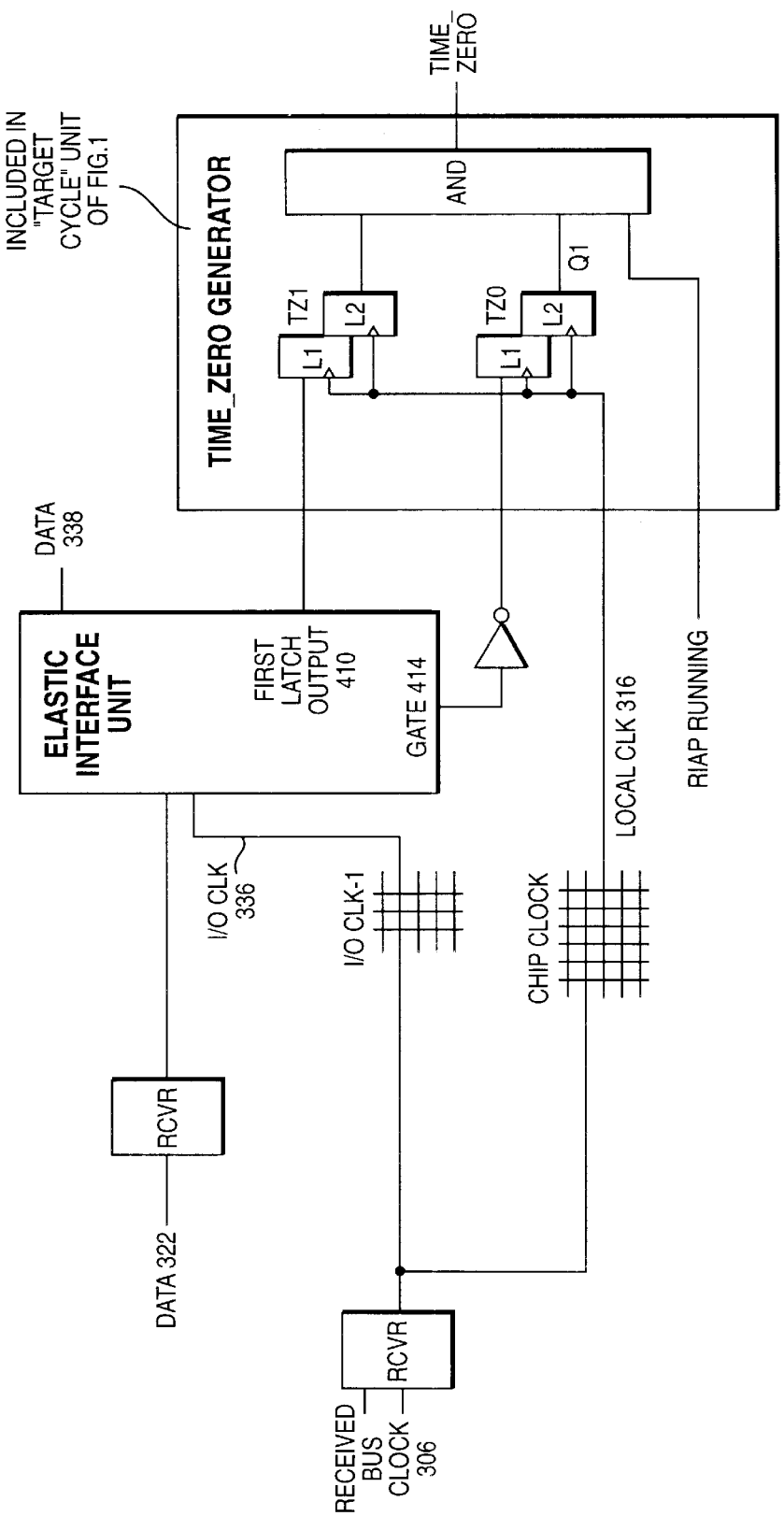
FIG. 5 illustrates, in block diagram form, certain details of control elements for the elastic interface unit.

Referring now to FIG. 5, there is shown a block diagram for generating the time zero signal shown near the bottom of timing diagram FIG. 7, responsive to the local clock 316, gate 414, and latch 408 output 410 signals. The time zero signal generated by the logic of FIG. 5 is asserted once every four cycles of the local clock 316, on the cycle for which the first data, i.e., the "1," in the data sequence "10001000 . . . is read out of the latches in the elastic interface unit.

Figure 6:
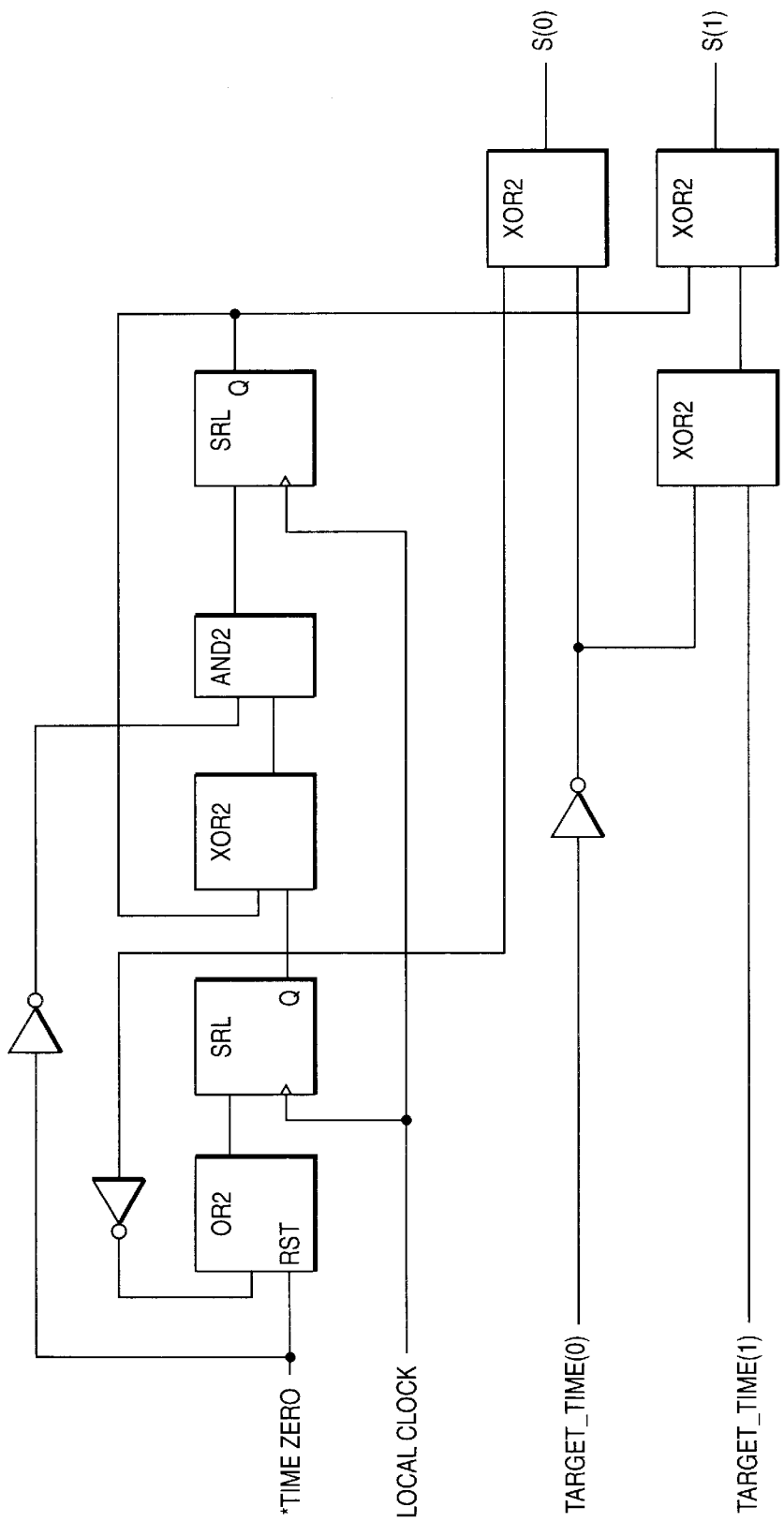
FIG. 6 illustrates, in block diagram form, certain additional details of control elements for the elastic interface unit.

Referring now to FIG. 6, there is shown a block diagram for generating two bits, S0 and S1, responsive to the time zero, local clock, target_time_0 and target_time_1 signals, for selecting among up to four latches in the elastic interface unit. For the two latch embodiment shown in FIG. 4, only one bit S0 is used for the MUX 432. Thus, in FIG. 7 the select control signal 343 corresponds to bit S0 in FIG. 6. The target_time_0 and target_time_1 signals are user programmable inputs for controlling which cycle of the local clock triggers reading data out of the latches 408, etc. Referring to FIG. 7, for the two latch embodiment described above, wherein the data is held two I/O clock cycles in each latch, the first data "a" is captured in latch 408 responsive to a "capturing" rising edge of the I/O clock 336, at time t1 as shown. A corresponding rising edge of the Local clock 316 occurs a little later than t1, as shown, due to latency of the Local clock relative to the I/O clock. Target_time_0 and target time_1 are both set to "0" in this case, so that the data "a" is read out of the first latch 408 on the first rising edge of the Local clock, i.e., the first Local clock rising edge subsequent to the Local clock rising edge which corresponds to the I/O clock capturing rising edge. If the Local clock latency were greater, and there were consequently three latches, so the data were held for three cycles of the I/O clock instead of two, then target_time_0 and target_time_1 would be set to "1" and "0" respectively, so that data would be read out on the second rising edge of the Local clock.

Figure 8:
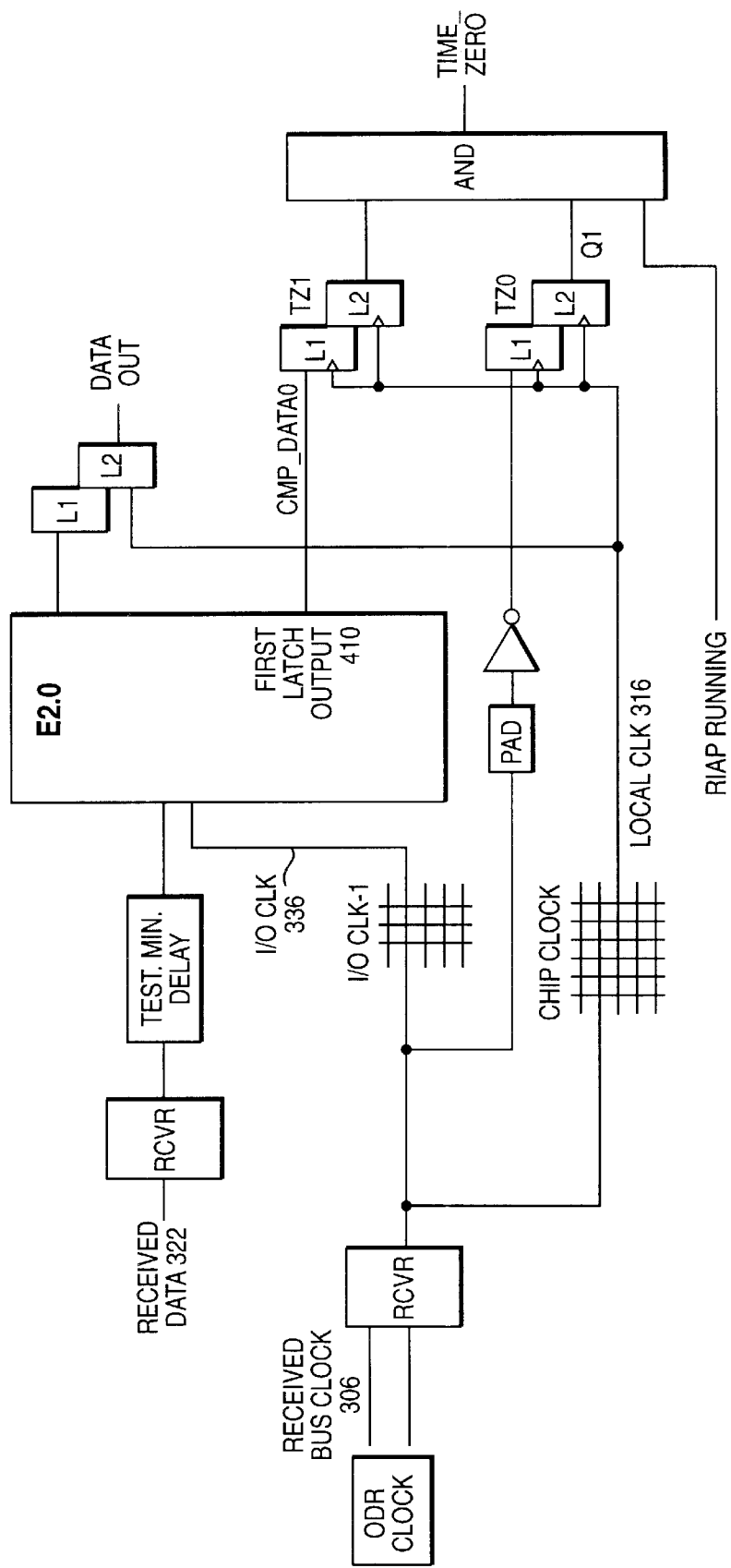
FIG. 8 illustrates, in block diagram form, certain details of control elements for the elastic interface unit in a half-speed communication application.
Figure 9:
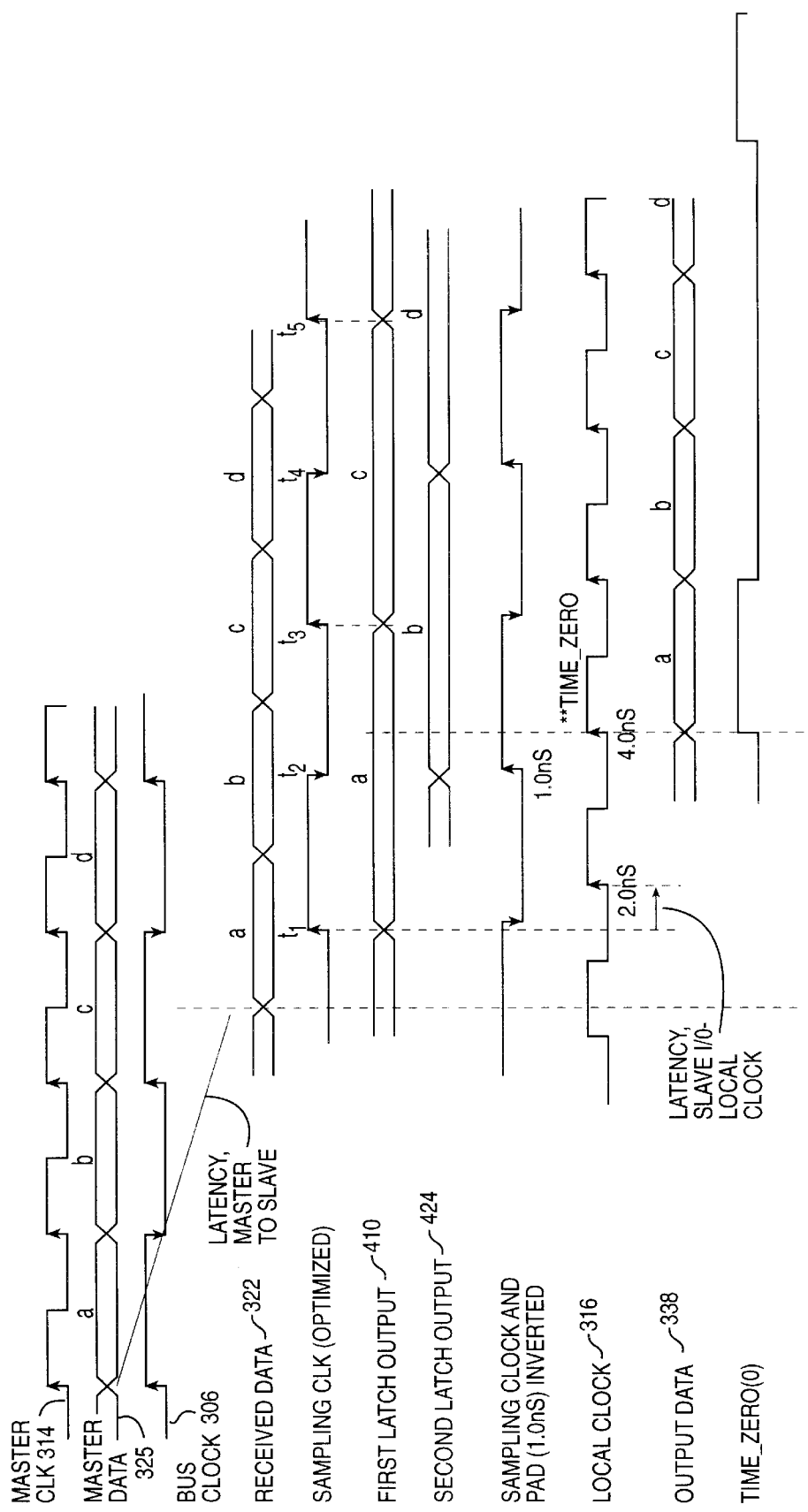
FIG. 9 is a timing diagram illustrating certain aspects of half-speed communication for the interface.

FIGS. 8 and 9 show a "half speed" variation to the timing and structure of FIGS. 5 and 7. According to the half speed variation, the bus clock 306 frequency is one half the frequency at which data 325 is asserted. Compare FIG. 9 with FIG. 7. The slave local clock 336 latency relative to the received Bus clock 306 is somewhat greater than shown in the example of FIG. 7. This greater local clock latency is not inherent in the half speed variation, but is merely for illustration. The logic for the half speed variation, as shown in FIG. 8, is like that of FIG. 5, except that in the half speed variation the time zero logic receives a padded, inverted signal from the received bus clock 306 instead of the gate 414 signal.

Figure 3:
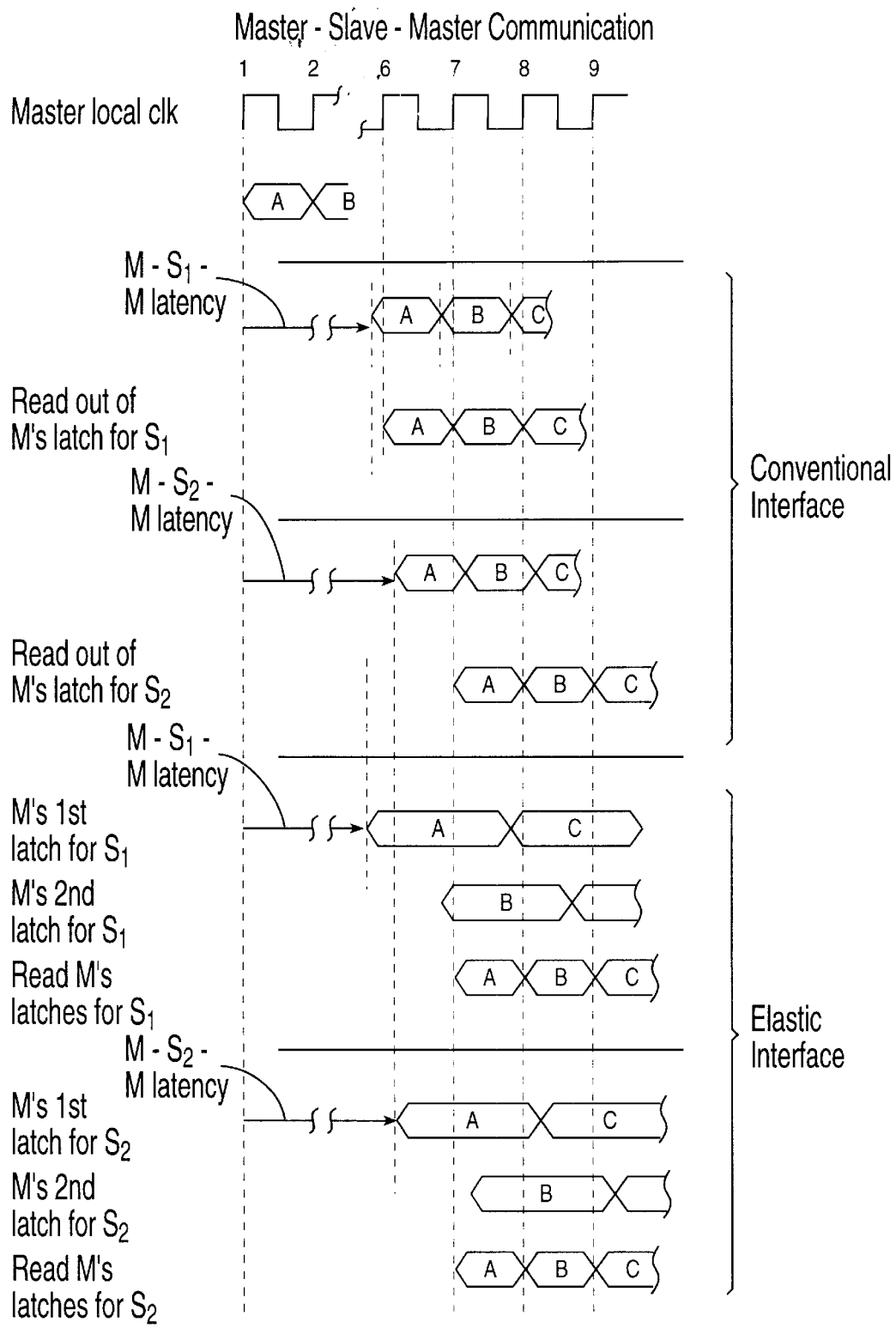
FIG. 3 is a timing diagram illustrating additional aspects of communication for the interface of FIG. 1.

An implication of the above relates to the elastic interface compensating for "round trip" latencies, i.e., latency associated with transmittal of data from master to slave and responsive data from slave back to master. This may be understood with reference to FIG. 3.

A sequence of data sets is shown being launched by the master, responsive to the master local clock. Each data set is asserted for one cycle of the master local clock. That is, data "a" is launched at rising edge 1 of the clock and asserted for one cycle, data "b" is launched at rising edge 2, etc. A first example is shown, for a conventional interface, where the latency from master to slave 1 to master is a little less than six cycles of the master local clock. Therefore data "a", i.e., data sent to the master from the slave 1 responsive to data "a" that was sent to the slave 1 by the master, is shown arriving at the master shortly before rising edge 6 of the master local clock and being read by the master on rising edge 6 of the master local clock. In the example, latency from master to slave 2 to master is a little more than six cycles of the master local clock. Therefore data "a", i.e., data sent to the master from the slave 2 responsive to data "a" that was sent to the slave 2 by the master, is shown arriving at the master shortly after rising edge 6 of the master local clock and being read by the master on rising edge 7 of the master local clock. Thus, the respective data sets from slave 1 and slave 2 are not in synchrony for the conventional interface in the master due to master-slave1-master having a different latency than master-slave2-master. As previously stated, this would conventionally be compensated for by padding the faster path, i.e., master-slave1-master, so that its latency equal to the slower path, master-slave 2-master.

For the elastic interface, the data "a" from slave 1, which is responsive to data "a" that was launched to slave 1 by the master on rising edge 1 of the master local clock and was asserted for one cycle of the clock, is shown: arriving at the master shortly before rising edge 6 of the master local clock; being captured at arrival; and being held in a slave 1 first latch for twice the duration that corresponding data "a" was originally asserted. Likewise, data "b" is shown being captured; being held in a slave 1 second latch, etc. And data "c" is shown being captured; being held in the slave 1 first latch; etc. Data "a" is read from the first latch on the target cycle, i.e., the rising edge 7 of the master local clock. Data "b" is read from the second latch on rising edge 8, etc.

Likewise, data "a" from slave 2, which is responsive to data "a" that was launched to slave 2 by the master on rising edge 1 of the master local clock and was asserted for one cycle of the clock, is shown: arriving at the master shortly after rising edge 6 of the master local clock; being captured at arrival; and being held in a slave 2 first latch for twice the duration that corresponding data "a" was originally asserted. Likewise, data "b" is shown being captured; being held in a slave 2 second latch, etc. And data "c" is shown being captured; being held in the slave 2 first latch; etc. Data "a" is read from the first latch on the target cycle, i.e., the rising edge 7 of the master local clock. Data "b" is read from the second latch on rising edge 8, etc.

From this example, it should be appreciated that although the latency for master-slave 1-master differs from the latency for master-slave 2-master, the elastic interface compensates by holding the both the slave 1 and slave 2 data in sequences of latches for a time, and then reading both slave 1 and slave 2 data sets out synchronously in their respective sequences, responsive to the master local clock. Furthermore, it should be appreciated that latencies may be unknown at the time of chip and package design, that the latencies can be determined upon initialization, and that the elastic interface may be programmed for particular target cycles according to the determined latencies, as described in one or more of the cross-referenced, incorporated applications.

It should also be appreciated that for the master, the number of cycles the data from each slave is held depends, at least in part, on the variation in round trip latency in the system. That is, in the embodiment of FIG. 9 the round trip latency for master-slave 1-master is not more than one master Local clock cycle shorter than the round trip latency for master-slave 2-master. Thus, in such a case the two received data sets is only be held for two cycles in the master in order to synchronize both sets of data. If the difference in the round trip latencies were greater than one but less than two Local clock cycles, then the received data sets would be held for three cycles of the master Local clock in order to synchronize the data sets.

Figure 10:
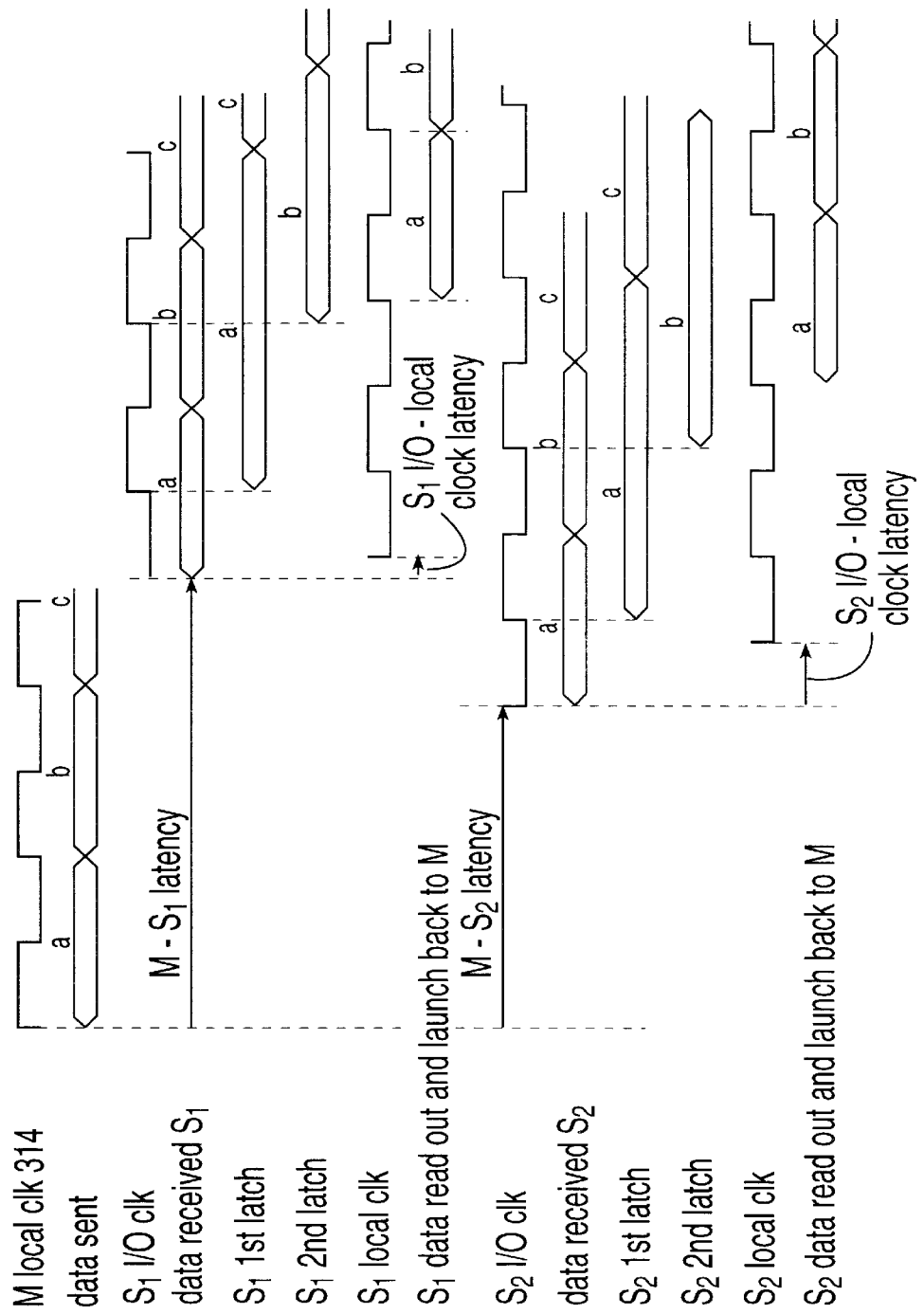
FIG. 10 is a timing diagram illustrating, certain aspects of communication for the interface of FIG. 1, particularly illustrating latency differences for two slaves.

Referring now to FIG. 10, differences in latency and similarities in operation are illustrated for communication among a master and first and second slaves. The latency from master to slave S1 is shown to be longer than from master to slave S2 in this embodiment. The I/O clock to Local clock latency for slave S1 is shown to be shorter than for slave S2. In both instances, the data sets are held for two cycles of the Local clock and read out of the slave's respective latches beginning on the first Local clock rising edge subsequent to the Local clock rising edge which corresponds to the I/O clock capturing rising edge, as was described in FIG. 7.

FIG. 10 also illustrates an aspect of the alignment and initialization procedure for the system, wherein, as previously stated, a data set, i.e., pattern, of "10001000 . . . " is sent from the master to each slave and back to the master from each slave. In each slave, data is launched back to the master on the same Local clock edge that the data is read out of the slave's latches. This is shown in FIG. 10, in that data "a" is shown being read out of the S1 first latch and concurrently launched back to the master. In this manner, there can be a consistent determination during initialization and alignment of the round trip latency from the master to each slave, including both the effects of i) master-slave communication path latency, and ii) slave I/O-Local clock latency.

It should also be appreciated that for the slaves, the number of cycles the data from the master is held depends, at least in part, on the variation in slave I/O-Local clock latency in the system. That is, in the embodiment of FIG. 10 the I/O-Local clock latency for slave 1 is not more than one master Local clock cycle shorter than that of slave 2. Thus, in such a case the received data sets is only held in the respective slaves for two cycles in order to achieve a consistent "time zero" setting for both sets of data. If for the two slaves there was a difference in the I/O-Local clock latencies of more than one Local clock cycle, but less than three, then the received data sets would be held for three cycles of the slave Local clocks in order to have consistent time zero settings.

Although the present invention and its advantages have been described in detail, it should be understood that various changes, substitutions and alterations can be made without departing from the spirit and scope of the invention as defined by the following claims.

What is claimed is:

1. A method for communicating between a master and slave device, comprising the steps of:
   a) sending a sequence of data sets and a clock signal ("Bus clock") from the master to the slave, wherein each successive set is are asserted by the master for a certain amount of time;
   b) receiving the data and Bus clock by the slave, including capturing the data by the slave, responsive to the received Bus clock;
   c) generating a slave I/O clock by the slave device from the received Bus clock, wherein in step b), capturing the data by the slave responsive to the received Bus clock comprises timing the capturing responsive to the slave's I/O clock;
   d) generating by the slave, from the received Bus clock, a clock ("slave Local clock") for clocking operations on the slave, wherein the slave Local clock is generated open-loop from the received Bus clock, so that the slave's local clock is not phase locked to the received Bus clock;
   e) holding the sequence of the received data sets in a sequence of latches in the slave, wherein the time for which each step is held in step e) is longer than the time for which each set is asserted in step a); and
   f) reading the data sets in their respective sequence from the latches, responsive to the Local clock, so that the holding of respective data sets for the relatively longer time in multiple latches and the reading of the data in sequence increases allowable skew of the Local clock relative to the received Bus clock, wherein second data sets are launched back to the master device by the slave device, responsive to the slave Local clock and the data sets received by the slave, and wherein the second data sets are received and captured by the master device, and are read by the master device responsive to a master Local clock.

2. The method of claim 1, wherein during an initialization, a certain pattern of data is sent from the master to the slave and the data is sent back to the master from the slave, and sending the data back comprises launching the data on a same edge of the slave Local clock for which the data is read out of the slave's latches, so that there is a determination, during initialization, of round trip latency from the master to the slave, which includes both the effects of i) communication path latency between master and slave, and ii) slave I/O clock to slave Local clock latency.

3. The method of claim 2, comprising the steps of setting a target cycle of the slave Local clock for reading the data sent by the master device and captured by the slave device, responsive to the initialization pattern; and setting a target cycle of the master Local clock for reading the data returned to and captured by the master device responsive to the initialization pattern.

4. The method of claim 1, wherein the slave Local clock is distributed to substantially more circuits on the slave device than is the slave I/O clock and therefore the slave Local clock inherently has a substantial latency relative to the slave I/O clock.

5. An apparatus for communicating between the master and slave device, comprising:
   a) means for sending a sequence of data sets and a clock signal ("Bus clock") from the master to the slave, wherein each successive set is asserted by the master for a certain amount of time;
   b) means for receiving the data and Bus clock by the slave, including means for capturing the data by the slave, responsive to the received Bus clock;
   c) means for generating by the slave, from the received Bus clock, a clock ("slave Local clock") for clocking operations on the slave;
   d) means for holding this sequence of the received data sets in a sequence of latches in the slave, each set being held for a time that is longer than the time for which the set was asserted by the master;
   e) means for reading the data sets in their respective sequence from latches, responsive to the Local clock, so that the holding of respective data sets for the relatively longer time in multiple latches in the reading of the data in sequence increases allowable skew of Local clock relative to the received Bus clock,
   f) means for launching second data sets back to the master device by the slave device, responsive to the slave Local clock and the data sets received by the slave;
   g) means for receiving and capturing the second data sets by the master device; and
   h) means for reading the second data sets by the master device responsive to a master Local clock.

6. The apparatus of claim 5, wherein an initialization means comprises, a means for sending certain pattern of data from the master to the slave, and means for launching the data back to the master from the slave on a same edge of the slave Local clock for which the data is read out of the slave's latches, so that there is a determination, during initialization, of round trip latency from the master to the slave, which includes both the effects of i) communication path latency between master and slave, and ii) slave I/O clock to slave Local clock latency.

7. The apparatus of claim 6, comprising means for setting a target cycle of the slave Local clock for reading the data sent by the master device and captured by the slave device, responsive to the initialization pattern; and means for setting a target cycle of the master Local clock for reading the data returned to and captured by the master device responsive to the initialization pattern.

8. The apparatus of claim 5, wherein the slave Local clock is distributed to substantially more circuits on the slave device than is the slave I/O clock and therefore the slave Local clock inherently has a substantial latency relative to the slave I/O clock.

9. A method for communicating between a master and slave device, comprising the steps of:
   a) sending a sequence of data sets and a clock signal ("Bus clock") from the master to the slave, wherein each successive set is asserted by the master for a certain amount of time;
   b) receiving the Bus clock by the slave device;
   c) generating, by the slave device from the received Bus clock, a slave I/O clock, wherein the slave device uses the slave I/O clock to time capture of data received by the slave;
   d) receiving the data by the slave, including capturing the data by the slave, responsive to the slave I/O clock;
   e) generating by the slave, from the received Bus clock, a clock ("slave Local clock") for distributing on the slave in order to source clocking operations for data processing on the slave, wherein the slave Local clock is distributed to substantially more circuits on the slave device than is the slave I/O clock and therefore the slave Local clock inherently has a substantial latency relative to the slave I/O clock;
   f) holding the sequence of the received data sets in a sequence of latches in the slave, each set being held for a time that is longer than the time for which the set was asserted by the master; and
   g) reading the data sets in their respective sequence from the latches responsive to the Local clock, so that allowable skew of the Local clock is increased relative to the received Bus clock.

10. The method of claim 9, wherein the slave Local clock is generated open-loop from the received Bus clock, so that the slave's Local clock is not phase locked to the received Bus clock.

11. The method of claim 9, comprising the steps of:
   launching second data sets back to the master device by the slave device, responsive to the slave Local clock and the data sets received by the slave; and
   capturing the second data sets by the master device responsive to a master Local clock.

12. The method of claim 9, wherein step a) comprises:
   sending a certain pattern of data from the master to the slave for an initialization procedure; and step f) comprises:
      sending the certain pattern of data back to the master from the slave, wherein the slave launches the pattern of data on a same edge of the slave Local clock for which the data is read out of the slave's latches, so that there is a determination of round trip latency from the master to the slave.

13. The method of claim 12, comprising the steps of:
   setting a target cycle of the slave Local clock for reading the data sent by the master device and captured by the slave device, responsive to the initialization pattern; and
   setting a target cycle of the master Local clock for reading the data returned to and captured by the master device responsive to the initialization pattern.

14. An apparatus for communicating between the master and slave device, comprising:
   a) means for sending a sequence of data sets and a clock signal ("Bus clock") from the master to the slave, wherein the successive sets are asserted by the master for a certain amount of time;
   b) means for receiving the Bus clock by the slave device;
   c) first generating means for generating, by the slave device from the received Bus clock, a slave I/O clock, wherein the first generating means uses the slave I/O clock to time capture of data received by the slave;
   d) means for receiving the data the slave, including means for capturing the data by the slave, responsive to the slave I/O clock;
   e) second generating means for generating by the slave, from the received Bus clock, a clock ("slave Local clock") for distributing on the slave in order to source clocking operations for data processing on the slave, wherein the slave Local clock is distributed to substantially more circuits on the slave device than is the slave I/O clock and therefore the slave Local clock inherently has a substantial latency relative to the slave I/O clock;
   f) means for holding this sequence of the received data sets in a sequence of latches in the slave, each set being held for a time that is longer than the time for which the set was asserted by the master; and
   g) means for reading the data sets in their respective sequence from latches, responsive to the Local clock, so that allowable skew of Local clock is increased relative to the received Bus clock.

15. The apparatus of claim 14, wherein means for generating the slave Local clock includes means for open-loop generation of the slave Local clock from the received bus clock, so that the slave's Local clock is not phase locked to the received Bus clock.

16. The apparatus of claim 14, comprising:
   means for launching second data sets back to the master device by the slave device, responsive to the slave Local clock and the data sets received by the slave; and
   means for capturing the second data sets by the master device responsive to a master Local clock.

17. The apparatus of claim 14, wherein the means for sending a sequence of data sets and a clock signal ("Bus clock") from the master to the slave comprises:
   means for sending a certain initialization pattern of data from the master to the slave for an initialization procedure; and
   means for launching the initialization pattern of data back to the master from the slave on a same edge of the slave Local clock for which the data is read out of the slave's latches, so that there is a determination of round trip latency from the master to the slave.

18. The apparatus of claim 17, comprising:
   means for setting a target cycle of the slave Local clock for reading the data sent by the master device and captured by the slave device, responsive to the initialization pattern; and
   means for setting a target cycle of the master Local clock for reading the data returned to and captured by the master device responsive to the initialization pattern.

* * * * *